United States Patent [19]

Speranza et al.

[11] 4,451,588

[45] May 29, 1984

[54] HIGH LOAD BEARING POLYURETHANE FOAMS MADE FROM MIXED INITIATOR POLYETHER POLYOLS

[75] Inventors: George P. Speranza; Michael Cuscurida; Bruce W. Peterson, all of Austin, Tex.

[73] Assignee: Texaco Inc., White Plains, N.Y.

[21] Appl. No.: 517,198

[22] Filed: Jul. 26, 1983

[51] Int. Cl.$^3$ .................... C08G 18/14; C08G 18/48
[52] U.S. Cl. .................... 521/175; 521/167; 521/174
[58] Field of Search .................... 521/174, 175, 167

[56] References Cited

U.S. PATENT DOCUMENTS

| | | | |
|---|---|---|---|
| 3,332,934 | 7/1967 | Booth et al. | 521/167 |
| 3,393,243 | 7/1968 | Cuscurida | 260/615 |
| 3,433,751 | 3/1969 | Yotsuzuka et al. | 521/175 |
| 3,442,888 | 5/1969 | Degginger et al. | 521/175 |
| 3,535,307 | 10/1970 | Moss et al. | 521/167 |
| 3,706,714 | 12/1972 | Lloyd et al. | 528/76 |
| 3,847,992 | 11/1974 | Moss | 521/164 |
| 4,166,172 | 8/1979 | Klein | 521/174 |
| 4,316,991 | 2/1982 | Speranza et al. | 521/174 |
| 4,380,502 | 4/1983 | Mueller et al. | 252/182 |

Primary Examiner—H. S. Cockeram
Attorney, Agent, or Firm—Jack H. Park; Kenneth R. Priem; David L. Mossman

[57] ABSTRACT

High load bearing flexible polyurethane foams are made using novel polyether polyols which may be made by alkoxylating a mixture of initiators. The initiator mixture is made up of about 60 to 90 wt. % of a partially alkoxylated trifunctional initiator and 10 to 40 wt. % of a secondary partially alkoxylated initiator having an active hydrogen functionality of from 4 to 8. Preferably, the alkylene oxide component to be reacted with the initiator mixture is a blend of ethylene oxide and propylene oxide.

12 Claims, No Drawings

HIGH LOAD BEARING POLYURETHANE FOAMS MADE FROM MIXED INITIATOR POLYETHER POLYOLS

CROSS-REFERENCE TO RELATED APPLICATION

This application is related to U.S. patent application Ser. No. 517,197, which is directed toward the novel polyether polyols which are made by alkoxylating a mixture of partially alkoxylated initiators, and filed of even date.

BACKGROUND OF THE INVENTION

1. Field of the Invention

The invention relates to flexible polyurethane foams made from polyether polyols and more particularly relates to flexible polyurethane foams using polyether polyols made from alkoxylating a mixture of partially alkoxylated initiators.

2. Other Polyols in the Field

Presently, polyether polyols suitable for use in flexible foams are made by the reaction of trifunctional initiators such as glycerine with mixtures of alkylene oxides. Persons skilled in the art of making polyols can add alkylene oxides to polyhydric initiators such as glycerine or to an intermediate molecular weight alkylene oxide adduct of the initiator to prepare products in the 40-60 hydroxyl number range. For examples of polyols made by this technique, see U.S. Pat. Nos. 3,393,243; 3,535,307; 3,706,714; 3,847,992; 4,166,172 and 4,316,991.

While generally satisfactory, foam prepared from the prior art polyols are not firm enough for many cushioning applications, particularly at lower foam densities. Conventional means of producing firmer (higher ILD) foams such as by using higher functionality initiators, short chain crosslinkers or fillers lead to other deficiencies in foam properties such as closed cells, poor tear and elongation properties and increased foam density. It is, therefore, an object of this invention to increase the functionality of triols and the like by mixing in a minor portion of a higher functionality polyol initiator. Several patents describe mixtures of initiators used to prepare polyols for polyurethane foams. Almost all are concerned with the preparation of polyols for rigid urethane foams. Usually, these processes involve sucrose with water, glycols, glycerine, etc. The use of lower functional polyols permit one to make polyols for rigid urethane foams that are easier to handle and the resulting rigid foams have much finer cells.

A recent example is U.S. Pat. No. 4,380,502 which employs 80 to 20 wt.% of formitol (a mixture of polyhydric alcohols having an average hydroxyl functionality of at least 3) and 20 to 80 wt.% of sucrose. The introductory section of this patent is a good summary of the art of mixed initiators and is incorporated by reference herein.

Also of interest is Japanese Kokai Tokkyo Koho JP No. 57,174,313 (82,174,313), see Chemical Abstracts 98: 144401c (1983). This disclosure describes urethane foams having good post formability by hot pressing which are prepared from reacting polyisocyanates and polyol mixtures. The polyol mixtures are 30 to 90 parts of polyether polyols derived from a 10 to 40:60 to 90 molar mixture of sucrose and glycerol, respectively, and alkylene oxides having a molecular weight between 4000 and 10,000, and 10 to 70 parts of polyether diols and/or triols having an average hydroxyl number between 50 and 300. Apparently, sucrose and glycerol are first mixed and then the alkylene oxides are reacted therewith (for example, a 90:10 propylene oxide/ethylene oxide mixture) before a polyether diol is added thereto to give the polyol component for the foams described therein. This method is quite different from the invention herein, particularly with regard to when the various alkoxylations take place.

SUMMARY OF THE INVENTION

The invention concerns a method for preparing high load bearing flexible urethane foams. An organic polyisocyanate is reacted with a mixed initiator polyether polyol in the presence of a catalytic amount of a polyurethane formation catalyst to make the foam. The polyol is made by reacting one or more alkylene oxides with a mixture of initiators. The mixture comprises 60 to 90 wt.% of a trifunctional partially alkoxylated initiator and 10 to 40 wt.% of a secondary partially alkoxylated initiator having an active hydrogen functionality of from 4 to 8. The process for making these polyols involves the unique technique of partially alkoxylating the triol initiator to an intermediate molecular weight and then adding the higher functional alkoxylated initiator. This mixture is then alkoxylated itself.

DETAILED DESCRIPTION OF THE PREFERRED EMBODIMENTS

As noted above, a mixture or blend of initiators is required. The majority of the mixture should comprise a trifunctional initiator; that is, a compound having three and only three active hydrogens. This initiator must be partially alkoxylated. Examples of suitable trifunctional initiators are alkylene oxide adducts of glycerine, trimethylolpropane, triethanolamine, 1,2,6-hexane triol, monoethanolamine, diethanolamine, aminoethylpiperazine, among others. Especially preferred triols are glycerine (also called glycerol), trimethylolpropane and triethanolamine. It is also preferred that the trifunctional initiator make up from about 60 to 90 wt.% of the initiator mixture, based on the total mixture weight.

An unusual feature of the invention is the incorporation of a minor portion of one other partially alkoxylated polyhydric initiator, termed a secondary initiator. The word "secondary" does not refer to the functionality of the initiator but is used to distinguish the initiator present in minor proportions as opposed to the major initiator discussed above. Preferably, the initiator is selected from a group of suitable initiators having 4 to 8 active hydrogens.

Suitable secondary initiators include alkylene oxide adducts of methyl glucoside, ethylenediamine, sorbitol, sucrose, hydroxypropyl glucoside, pentaerythritol, erythritol, among others. Particularly preferred are methyl glucoside, ethylenediamine, sorbitol and sucrose. The secondary initiator should comprise from about 10 to 40 wt.% of the total initiator mixture.

The alkylene oxide to be added into the mixed alkoxylated polyhydric initiators may be ethylene oxide, propylene oxide, 1,2-butylene oxide and mixtures thereof. It is especially preferred that the alkylene oxide component to be used is a mixture of ethylene oxide and propylene oxide. These same alkylene oxides are the ones suitable for addition to the initiators before mixing.

The amount of alkylene oxide component to be employed in each initiator will vary. Therefore, the average functionality of the initiator mixture will vary and the amount of alkylene oxide component required to further totally alkoxylate the mixture of alkoxylated initiators will also vary. The molecular weight and hydroxyl number of the polyol may be built up by using an excess of alkylene oxide component beyond what is necessary to totally alkoxylate the initiators. The reaction should be conducted with a catalyst at an elevated temperature in the range of about 75° to 150° C. A well known way of conducting this alkoxylation reaction is to use a catalyst, frequently an alkaline catalyst such as sodium hydroxide or potassium hydroxide. Other catalysts are also known such as cesium hydroxide, calcium hydroxide, trialkylamines and aqueous ammonia.

The resulting polyols may have a molecular weight in the range of between 1000 and 20,000. It is preferred that the polyols have a molecular weight between 3000 and 10,000 and especially preferred that the molecular weight be between 3000 and 6500. These polyether polyols are particularly suited for the preparation of flexible polyurethane foam. Foams made from these polyols have improved load bearing properties as compared to those made from prior art polyols. Surprisingly, the improved load bearing characteristics of these foams were not made at the expense of other important properties.

Examples of foam preparation are presented to demonstrate the utility of the polyether polyols. It is well known that flexible and other types of foams may be made generally by reacting the polyols with polyisocyanates in the presence of a polyurethane formation catalyst, such as a tertiary amine or tin catalyst, optionally in the presence of a blowing agent and other additives. For more details on polyurethane foam preparation see U.S. Pat. No. 3,535,307, among others.

The polyether polyol invention is further illustrated by the following examples.

EXAMPLE 1

This example will illustrate the preparation of the polyether polyols of this invention.

Into a ten-gallon kettle were charged 9.0 pounds of a 600 molecular weight ethylene oxide/propylene oxide (EO/PO) adduct of glycerine (alkalinity mg KOH/g 26; hydroxyl number, corrected, mg KOH/g 273) and 1.0 pound of a 480–500 hydroxyl number PO adduct of sorbitol (Atlas G-2410, made by Atlas Minerals and Chemicals Co.). The reactor was then evacuated and purged with nitrogen. Maintaining a nitrogen sweep, the initiators were heated to 105° C. A mixture of 37.4 pounds of PO and 1.4 pounds of EO were then reacted at 105°–110° C. at 50 psig. Propylene oxide (1.5 pounds) was then reacted at 105°–100° C. After a two hour digestion period, water (51 g) was added and the mixture stirred 15 minutes. The alkaline product was then neutralized by stirring 15 minutes with 127 g of oxalic acid. A synthetic magnesium silicate (106 g) was then charged as an aqueous slurry and stirred two hours. Di-t-butyl-p-cresol (91.3 g), octylated diphenylamine (13.7 g) and Hyflo Supercel filter aid (150 g) were then added to the neutralized product. The product was then stripped to a minimum pressure at 105°–110° C., nitrogen stripped one-half hour and filtered. The finished product had the following properties:

| Properties | |
|---|---|
| Acid number, mg KOH/g | 0.007 |
| Hydroxyl number, mg KOH/g | 61.2 |
| Water, wt. % | 0.01 |
| Unsaturation, meq/g | 0.025 |
| pH in 10:6 isopropanol/water | 7.3 |
| Color, Pt—Co | 25 |
| Sodium, ppm | 0.16 |
| Potassium, ppm | 0.85 |
| Peroxide, ppm | 0.90 |
| Viscosity, °F., cs | |
| 77 | 483 |
| 100 | 240 |

EXAMPLES 2 AND 3

Polyols with a higher sorbitol content were prepared using the following reaction charges and the procedure of Example 1.

| Example | 2 | 3 |
|---|---|---|
| Charge | | |
| 600 mw. PO/EO adduct of glycerine, lb. | 8.0 | 7.0 |
| Atlas G-2410 sorbitol polyol, lb. | 2.0 | 3.0 |
| Propylene oxide, lb  ⎫ | 46.5 | 47.4 |
| Ethylene oxide, lb   ⎬ mixed | 1.7 | 1.8 |
| Propylene oxide, lb | 1.8 | 1.5 |
| Water, g | 45.4 | 50.0 |
| Oxalic acid, g       ⎫ Neutral- | 113 | 107 |
| Synthetic magnesium ⎬ ization | 94.0 | 83.0 |
| silicate, g          ⎭ Step | | |
| Di-t-butyl-p-cresol, g | 109 | 113.8 |
| Octylated diphenylamine, g | 16.3 | 17.1 |
| Hyflo Supercel, g | 100 | 150 |
| Reaction Details | | |
| Oxide addition time, hr | 5.75 | 6.1 |
| Temperature, °C. | 105–110 | 110–115 |
| Pessure, psig | 50 | 50 |
| Properties | | |
| Acid number, mg KOH/g | 0.012 | 0.005 |
| Hydroxyl number, mg KOH/g | 54.8 | 59.0 |
| Unsaturation, meq/g | 0.03 | 0.04 |
| Water, wt. % | 0.01 | 0.01 |
| pH in 10:6 isopropanol/water | 7.4 | 7.5 |
| Color, Pt—Co | 100 | 40 |
| Sodium, ppm | 0.7 | 4.9 |
| Potassium, ppm | 6.1 | 2.0 |
| Peroxide, ppm | 0.95 | 0.8 |
| Viscosity, °F., cs | | |
| 77 | 547 | 557 |
| 100 | 274 | 277 |

EXAMPLE 4

This example will illustrate the preparation of the polyols of this invention using a sucrose-based polyol as a co-initiator. The polyol was prepared using the procedure of Example 1. Reaction charges, details of preparation and polyol properties are as follows:

| Charge | |
|---|---|
| 600 molecular weight glycerine EO/PO adduct, lb | 8.0 |
| MULTRANOL ® M-5034[1], lb | 2.0 |
| Propylene oxide, lb  ⎫ | 46.5 |
| Ethylene oxide, lb   ⎬ mixed | 1.7 |
| Propylene oxide, lb | 1.8 |
| Water, g | 45 |
| Oxalic acid, g       ⎫ Neutral- | 121 |
| Synthetic magnesium ⎬ ization | 93 |
| silicate, g          ⎭ Step | |
| Di-t-butyl-p-cresol, g | 109 |

| -continued | |
|---|---|
| Octylated diphenylamine, g | 16.3 |
| Hyflo Supercel, g | 100 |
| Reaction Details | |
| Oxide addition time, hr | 6.8 |
| Temperature, °C. | 110-115 |
| Pressure, psig | 50 |
| Properties | |
| Acid number, mg KOH/g | 0.006 |
| Hydroxyl number, mg KOH/g | 57.7 |
| Water, wt. % | 0.012 |
| pH in 10:6 isopropanol/water | 7.4 |
| Color, Pt—Co | 75 |
| Sodium, ppm | 0.3 |
| Potassium, ppm | 4.4 |
| Peroxide, ppm | 0.9 |
| Viscosity, °F., cs | |
| 77 | 534 |
| 100 | 263 |

[1]Neutral sucrose polyol, hydroxyl number 470 mg KOH/g; made by Mobay Chemical Co.

EXAMPLE 5

This example will show the use of the polyols of this invention in the preparation of flexible urethane foams. It will further show the higher load bearing properties (ILD) of foams made from these polyols as compared to those based on prior art polyols. Additionally, these higher load bearing properties were not obtained at the expense of other properties. All foams were prepared using a Martin-Sweets foam machine.

| Foam No. | A | B | C | D | E | F |
|---|---|---|---|---|---|---|
| Formulation, pbw | | | | | | |
| THANOL ® F-3016[1] | — | 100 | — | 100 | — | 100 |
| Polyol Example 1 | 100 | — | — | — | — | — |
| Polyol, Example 2 | — | — | 100 | — | — | — |
| Polyol, Example 3 | — | — | — | — | 100 | — |
| Water | 4.0 | 4.0 | 4.0 | 4.0 | 4.0 | 4.0 |
| Silicone surfactant 7-11[2] | 1.0 | 1.0 | 1.0 | 1.0 | 1.0 | 1.0 |
| T-10 catalyst[3] | 0.4 | 0.4 | 0.4 | 0.4 | 0.4 | 0.4 |
| THANCAT ® TD-33[4] | 0.3 | 0.3 | 0.3 | 0.3 | 0.3 | 0.3 |
| Toluene diisocyanate (TDI) | 52.96 | 52.1 | 51.9 | 52.1 | 52.62 | 52.1 |
| Isocyanate index | 1.10 | 1.10 | 1.10 | 1.10 | 1.10 | 1.10 |
| Pour Conditions | | | | | | |
| Room temp/relative humidity | 76/75 | 76/76 | 76/55 | 71/57 | 77/40 | 75/39 |
| TDI temp/polyol temperature | 72/77 | 72/76 | 67.71 | 66.71 | 72/76 | 70/75 |
| Properties | | | | | | |
| Density, pcf | 1.52 | 1.54 | 1.57 | 1.53 | 1.55 | 1.55 |
| 25% ILD | 49.8 | 43.5 | 52.9 | 41.8 | 55.1 | 48.0 |
| 65% ILD | 92.0 | 82.8 | 98.5 | 78.0 | 103 | 85.0 |
| Compression set, 50% | 6.4 | 6.5 | 11.6 | 4.8 | 4.3 | 2.8 |
| Compression set, 90% | 7.1 | 6.5 | 17.7 | 5.5 | 7.9 | 3.2 |
| Tensile, psi | 17.9 | 17.8 | 14.7 | 16.5 | 14.3 | 13.8 |
| Elongation, % | 155 | 167 | 115 | 170 | 103 | 140 |
| Tear, pli | 2.3 | 2.6 | 1.6 | 2.2 | 1.3 | 1.9 |
| Ball rebound | 43 | 47 | 42 | 48 | 48 | 46 |
| Breathability | 2.9 | 4.1 | 1.6 | 4.9 | 2.7 | 4.6 |
| Humid aging (5 hrs at 250° F.) | | | | | | |
| Compression set, 50% | 10.7 | 9.8 | 11.9 | 8.8 | 7.9 | 6.1 |
| CLD loss, 50% | 20.6 | 17.7 | 21.2 | 21.8 | 16.9 | 16.0 |

[1]3,000 molecular weight mixed poly(oxyethyleneoxypropylene)triol made by Texaco Chemical Co., Inc.
[2]Made by Union Carbide Chemical Corp.
[3]50% stannous octoate in dioctyl phthalate sold by M&T Chemicals
[4]33% triethylenediamine in propylene glycol made by Texaco Chemical Co., Inc.

It has been found that when an alkoxylated triol, such as glycerol (glycerine), is mixed with an unalkoxylated polyol, such as pentaerythritol (PE), the mixture of which is later alkoxylated additionally, the polyol which results is unsatisfactory in that it is hazy and/or the unalkoxylated or unreacted polyol tends to settle out as solids. This seems to hold true for levels of 0.5 to 10% of PE in the polyol component. The following comparative examples will illustrate this point; namely, that to make a satisfactory polyether polyol of this type, all of the initiators used should be alkoxylated before the initiators are mixed and further alkoxylated to give a stable product.

EXAMPLE 6

This example will illustrate the preparation of a polyol using a mixture of a 700 molecular weight propylene oxide adduct of glycerine and unalkoxylated pentaerythritol as the initiators. It will further show that an unstable product was formed as solids came out of solution on storage. This polyol was not acceptable for preparation of flexible foams.

Ten pounds of a 700 molecular weight propylene oxide adduct of glycerine (alkalinity, mg KOH/g 26.16) were added to the reactor. The reactor was then evacuated and purged with prepurified nitrogen. The initiator was then heated to 110° C. and 0.5 pound crystalline pentaerythritol added and stirred until it went into solution. A mixture of 37.0 pounds of propylene oxide and 8.12 pounds of ethylene oxide was then reacted at 105°-110° C. at 50 psig. Approximately five to six hours were required for addition of the mixed oxides. The reaction was then terminated by reaction with 1.7 pounds of propylene oxide. The reaction mixture was then digested two hours to an equilibrium pressure and neutralized with 153 g of oxalic acid. Di-t-butyl-p-cresol (51.6 g), octylated diphenylamine (5.2 g) and Hyflo Supercel filter aid (75 g) were then added to the reaction mixture. The neutralized product was then vacuum stripped to a minimum pressure, nitrogen stripped and filtered. The finished product had the following properties.

| | |
|---|---|
| Acid number, mg KOH/g | 0.008 |
| Hydroxyl number, mg KOH/g | 47.4 |

-continued

| | |
|---|---|
| Water, wt. % | 0.01 |
| Unsaturation, meq/g | 0.03 |
| pH in 10:6 isopropanol/water | 7.3 |
| Color, Pt—Co | Hazy, could not determine |
| Sodium, ppm | 0.4 |
| Potassium, ppm | 6.2 |
| Peroxide, ppm | 2.0 |

The above product was quite hazy when initially filtered and solids came out of solution on cooling. The infrared spectra of the solids identified them as unreacted pentaerythritol. Such a product would not be suitable for use in foam manufacture.

EXAMPLE 7

Using the procedure of Example 6, a polyol was prepared using the following reactants:

| | |
|---|---|
| Precatalyzed 700 molecular weight propylene oxide adduct of glycerine, lb | 9.0 |
| Pentaerythritol, lb | 1.0 |
| Propylene oxide, lb | 37.0 |
| Ethylene oxide, lb | 8.12 |
| Propylene oxide, lb | 1.7 |
| Oxalic acid, g | 153 |
| Di-t-butyl-p-cresol, g | 51.6 |
| Octylated diphenylamine, g | 5.2 |
| Hyflo Supercel, g | 75 |

The finished product which had a hydroxyl number of 59.6 mg KOH/g was hazy after filtration and solids, which were identified as unreacted pentaerythritol, came out of solution on cooling. The finished product had the following properties:

| | |
|---|---|
| Acid number, mg KOH/g | 0.014 |
| Hydroxyl number, mg KOH/g | 59.6 |
| Water, wt. % | 0.01 |
| Unsaturation, meq/g | 0.021 |
| pH in 10:6 isopropanol/water | 6.0 |
| Color, Pt—Co | Hazy |
| Potassium, ppm | 0.18 |
| Peroxide, ppm | 2.57 |

Many modifications may be made in the high load bearing flexible polyurethane foams of this invention without departing from its spirit and scope which are defined only by the appended claims. For example, one skilled in the art could modify the modes of addition of reactants, reaction temperatures and reaction propertions to optimize the properties of the resulting polyether polyol which is used in making the flexible polyurethane foams.

We claim:

1. A method for producing a flexible polyurethane foam having improved load bearing properties comprising reacting an organic polyisocyanate with a mixed initiator polyether polyol in the presence of a catalytic amount of a polyurethane formation catalyst and a blowing agent, where the polyol is made by reacting
   a. one or more alkylene oxides with
   b. a mixture of initiators consisting essentially of
      (1) 60 to 90 wt.% of a trifunctional partially alkoxylated initiator, and
      (2) 10 to 40 wt.% of a secondary partially alkoxylated initiator having an active hydrogen functionality of from 4 to 8.

2. The method of claim 1, in which in the making of the polyol, the alkylene oxide used is selected from the group consisting of ethylene oxide, propylene oxide, 1,2-butylene oxide and mixtures thereof.

3. The method of claim 1, in which in the making of the polyol, the trifunctional initiator is an alkylene oxide adduct of a triol selected from the group consisting of glycerine, trimethylolpropane and triethanolamine and in which the secondary initiator is an alkylene oxide adduct of a polyol selected from the group consisting of methyl glycoside, sorbitol and sucrose.

4. The method of claim 1 in which the mixed initiator polyether polyol has a molecular weight in the range from 1,000 to 20,000.

5. The method of claim 1 in which the mixed initiator polyether polyol is made at a temperature in the range from about 75° to 150° C. and in the presence of a catalytic amount of an alkaline catalyst.

6. The method of claim 1 in which the ratio of equivalents of NCO groups to OH groups is about 1:1.

7. A flexible polyurethane foam having improved load bearing properties made by reacting an organic polyisocyanate with a mixed initiator polyether polyol in the presence of a catalytic amount of a polyurethane formation catalyst and a blowing agent, where the polyol is made by reacting
   a. one or more alkylene oxides with
   b. a mixture of initiators consisting essentially of
      (1) 60 to 90 wt.% of a trifunctional partially alkoxylated initiator, and
      (2) 10 to 40 wt.% of a secondary partially alkoxylated initiator having an active hydrogen functionality of from 4 to 8.

8. The flexible polyurethane foam of claim 7, in in which in the making of the polyol, the alkylene oxide used is selected from the group consisting of ethylene oxide, propylene oxide, 1,2-butylene oxide and mixtures thereof.

9. The flexible polyurethane foam of claim 7, in which in the making of the polyol, the trifunctional initiator is an alkylene oxide adduct of a triol selected from the group consisting of glycerine, trimethylolpropane and triethanolamine and in which the secondary initiator is an alkylene oxide adduct of a polyol selected from the group consisting of methyl glycoside, sorbitol and sucrose.

10. The flexible polyurethane foam of claim 7 in which the mixed initiator polyether polyol has a molecular weight in the range from 1,000 to 20,000.

11. The flexible polyurethane foam of claim 7 in which the mixed initiator polyether polyol is made at a temperature in the range from about 75° to 150° C. and in the presence of a catalytic amount of an alkaline catalyst.

12. The flexible polyurethane foam of claim 7 in which the ratio of equivalents of NCO groups to OH groups is about 1:1.

* * * * *